United States Patent
McGrath

[19]

[11] Patent Number: 5,996,786
[45] Date of Patent: Dec. 7, 1999

[54] RECORDING DISK STORAGE APPARATUS

[76] Inventor: Brian McGrath, 3070 West 12th Avenue, Vancouver, British Columbia V6K 2R5, Canada

[21] Appl. No.: 09/090,284

[22] Filed: Jun. 4, 1998

[51] Int. Cl.⁶ .................................................. B65D 85/57
[52] U.S. Cl. ...................... 206/308.1; 312/9.9; 364/708.1
[58] Field of Search ................................ 206/307, 308.1, 206/308.3; 211/41.12; 224/148.3, 241, 417, 430, 905; 312/9.9; 361/683, 686; 364/705.01, 708.1; 369/273, 274, 291

[56] References Cited

U.S. PATENT DOCUMENTS

| | | | |
|---|---|---|---|
| D. 381,947 | 8/1997 | Bergh et al. | 206/308.3 |
| D. 389,000 | 1/1998 | Etingin | 206/308.3 |
| 4,171,760 | 10/1979 | Gay | 224/241 |
| 4,442,960 | 4/1984 | Vetter | 224/417 |
| 4,580,706 | 4/1986 | Jackson et al. | 224/417 |
| 4,651,872 | 3/1987 | Joyce | 206/308.3 |
| 5,476,172 | 12/1995 | Hunt et al. | 206/308.1 |
| 5,590,827 | 1/1997 | Nimpoeno | 206/308.1 |
| 5,628,436 | 5/1997 | Jones et al. | 224/148.3 |
| 5,762,246 | 6/1999 | Drew | 206/308.1 |
| 5,860,550 | 1/1999 | Miller et al. | 220/377 |

*Primary Examiner*—Jim Foster
*Attorney, Agent, or Firm*—Norman M. Cameron

[57] ABSTRACT

A recording disk storage apparatus includes a saddle shaped and sized to fit over a support object, such as a computer component. There is a case connectible to the saddle which has an interior cavity shaped and sized to receive a plurality of recording disks. Preferably the case is releasably connected to the saddle. There may be a strap extendable below the support object to retain the saddle on the support object.

3 Claims, 4 Drawing Sheets

RECORDING DISK STORAGE APPARATUS

This invention relates to apparatuses for storing recording disks such as computer disks and other types of compact discs.

BACKGROUND OF THE INVENTION

Recording disks of various types are used for storing computer data as well as for other information such as sound or video recordings. A computer user or audiophile may own scores or even hundreds of such recording disks. Organizing these disks and storing them conveniently has been an ongoing problem. Many types of storage cabinets and containers have been devised. However not all of these make the recording disks readily available when they are desired.

For example, a computer user may Lave a very limited space available at a workstation with essentially no room for a storage cabinet or the like. Most computers Lave only a single player for each type of replaceable, recording disks, such as CDROMs. During a work day, the user may have to change disks many times. This often leads to a cluttered working surface with scattered CDROM jewel cases scattered thereon.

It would be desirable to provide an improved storage apparatus for recording disks which would allow computer users to store and organize many different recording disks without the need for a significant space for a conventional storage cabinet.

It is therefore an object of the invention to provide an improved recording disk storage apparatus' which can be used in conjunction with an existing support object, such as a computer component, like a computer tower or monitor.

It is also an object of the invention to provide an improved recording disk storage apparatus which is simple in construction and economical to produce and sell.

It is a further object of the invention to provide an improved recording disk storage apparatus which can be readily moved when desired.

SUMMARY OF THE INVENTION

In accordance with these objects, there is provided a recording disk storage apparatus comprising a saddle shaped and sized to fit over a support object. There is that least one case connectible to the saddle and Laving an interior cavity shaped and sized to receive a plurality of recording disks.

The case may be releasably connected to the saddle by, for example, at least one hook and loop type fastener.

There may be a strap extendable below the support object. The support object may be, for example, a computer component.

DETAILED DESCRIPTION OF THE PREFERRED EMBODIMENTS

Figure 1:
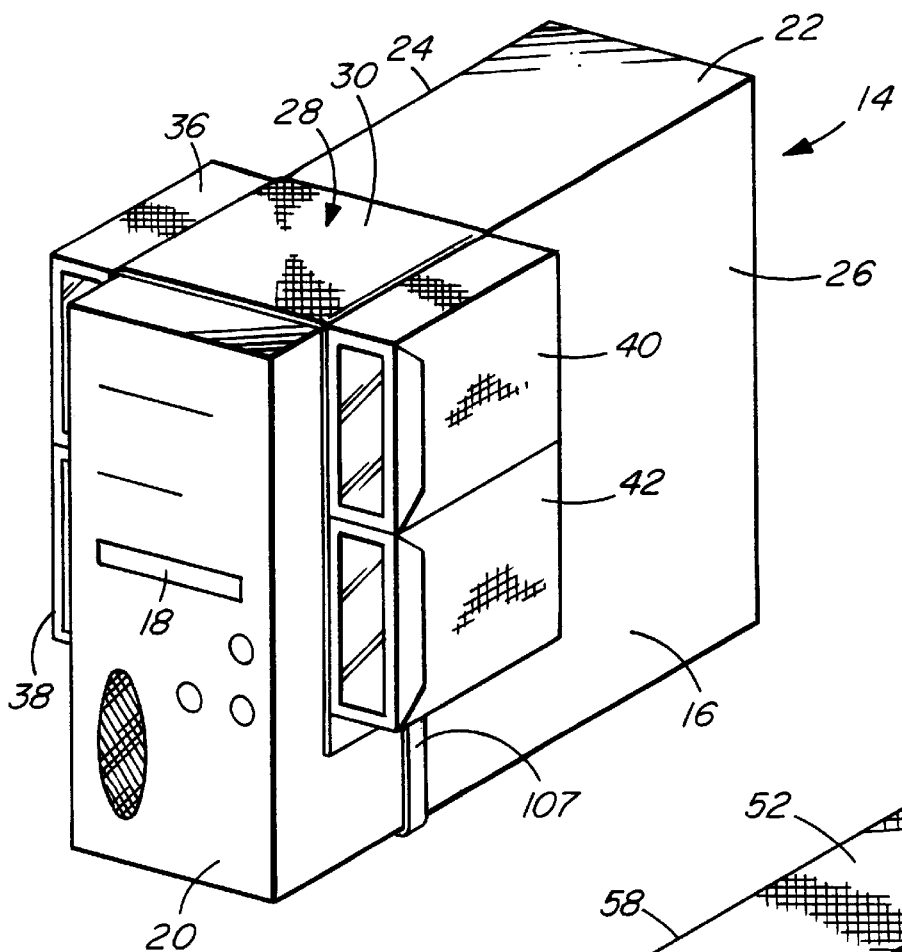
FIG. 1 is a top, side isometric view of a computer storage apparatus according to an embodiment of the invention.

Referring first to FIG. 1, this shows a recording disc storage apparatus 14 with a computer component, in this case a conventional computer tower 16 having a CD-ROM player 18 on front 20 thereof. The tower has a top 22 and opposite sides 24 and 26.

There is a saddle 28 which is shaped and sized to fit over the tower which serves as a support object for the saddle. The saddle in this example is of a flexible material, namely cotton fabric, although other materials could be substituted. The saddle has a top 30 and opposite sides 32 and 34, the former being shown in FIGS. 3 and 4.

Figure 2:
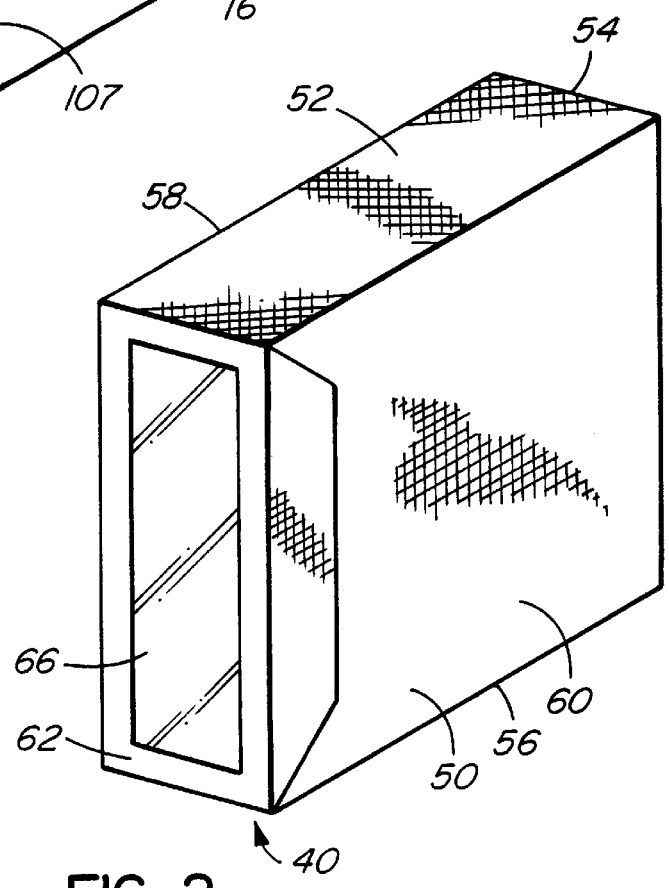
FIG. 2 is a top, side isometric view of one of the cases thereof.
Figure 3:
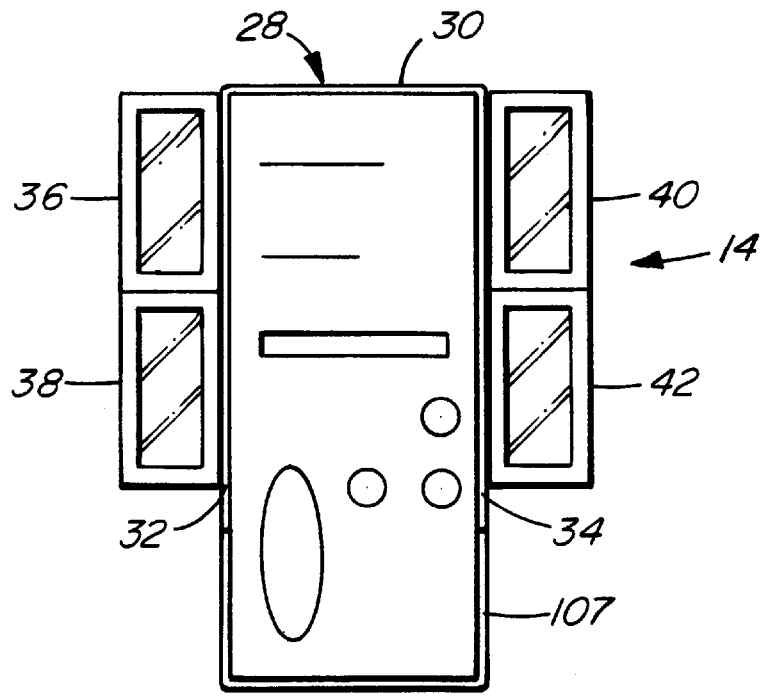
FIG. 3 is a front view of the apparatus of FIG. 1.
Figure 4:
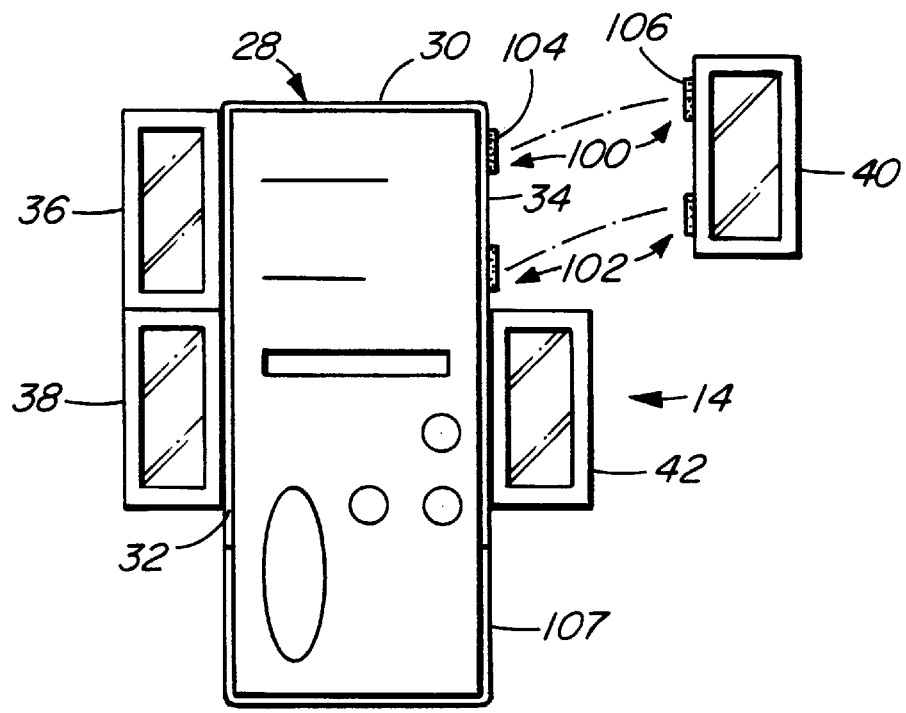
FIG. 4 is a view similar to FIG. 3 with one of the cases removed.

The apparatus also includes a plurality of cases, four such cases 36, 38, 40 and 42 being shown in FIGS. 1, 3 and 4. All of these cases are similar to each other, cases 36 and 38 being mirror images of cases 40 and 42. Case 40 is shown in better detail in FIGS. 2 and 6.

The cases could be of the various materials, but in this particular example each case has a fabric cover 50 including a top 52, a back 54, the bottom 56 and opposite sides 58 and 60. There is a front door 62 formed by a flap of the cover. There is a clear panel 66 in the door, of PVC in this particular example.

There is a hook and loop type fastener 70, Laving two components 71 and 72 mounted on the inside of the door and side 50 of the case respectively. This allows the door to be secured shut or open as desired.

Figures 5, 6:
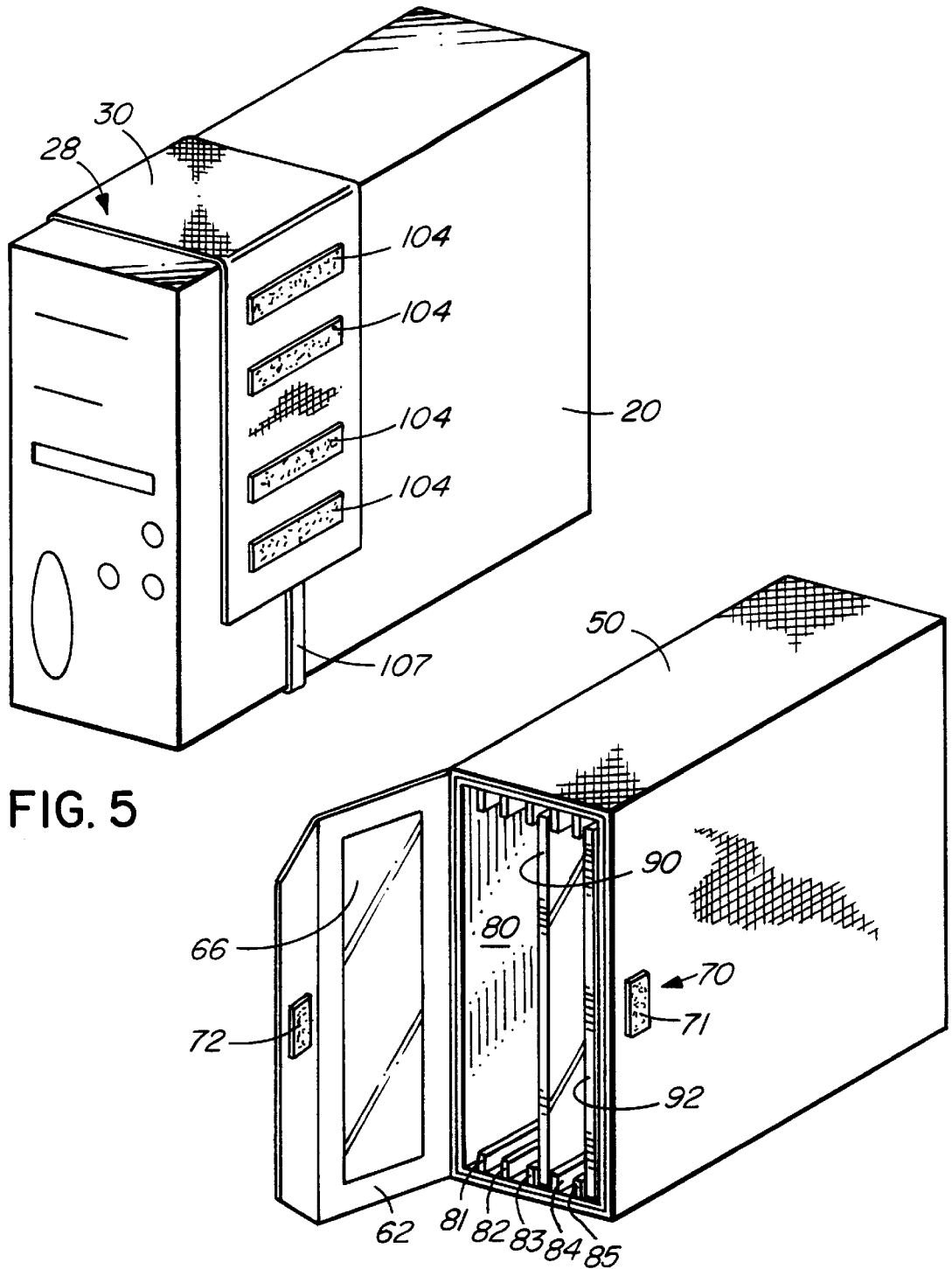
FIG. 5 is a view similar to FIG. 1 with the cases removed.
FIG. 6 is a view similar to FIG. 2 with the front door open and showing two compact disk jewel cases therein.

Inside the case is a rigid, box-like insert 80 including a plurality of spaced-apart guide tracks 81, 82, 83, 84 and 85 as shown best in FIG. 6. These guide tracks are capable of slidably receiving compact disc jewel cases, such as jewel cases 90 and 92 shown in FIG. 6.

Figure 7:
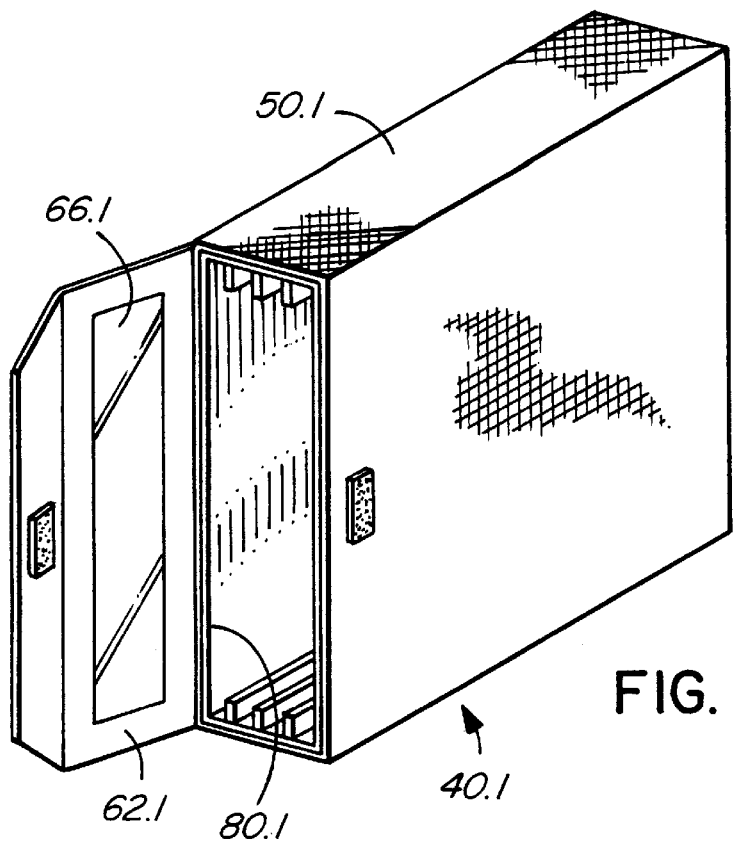
FIG. 7 is a view similar to FIG. 6 of a smaller case.

A smaller case 40. 1 is shown in FIG. 7, where like parts have like numbers. In this case there are only three guide tracks, but otherwise the case is similar to case 40.

The saddle 28, along with the hook and loop fastener fasteners 100 and 102, as shown in FIG. 4 and 5, serve as means for releasably mounting each case on the computer tower or other such support object. The hook and loop fasteners 100 and 102 are shown only in FIG. 4, where case 40 has been separated from saddle 28. However similar hook and loop type fasteners connect cases 36, 38 and 42 to the saddle. In this example, each fastener has two complementary components 104 and 106, the former being connected to the saddle and the latter to the case. An expandable strap 107 extends from each side of the saddle below tower 22 to secure the apparatus in place.

Figure 8:
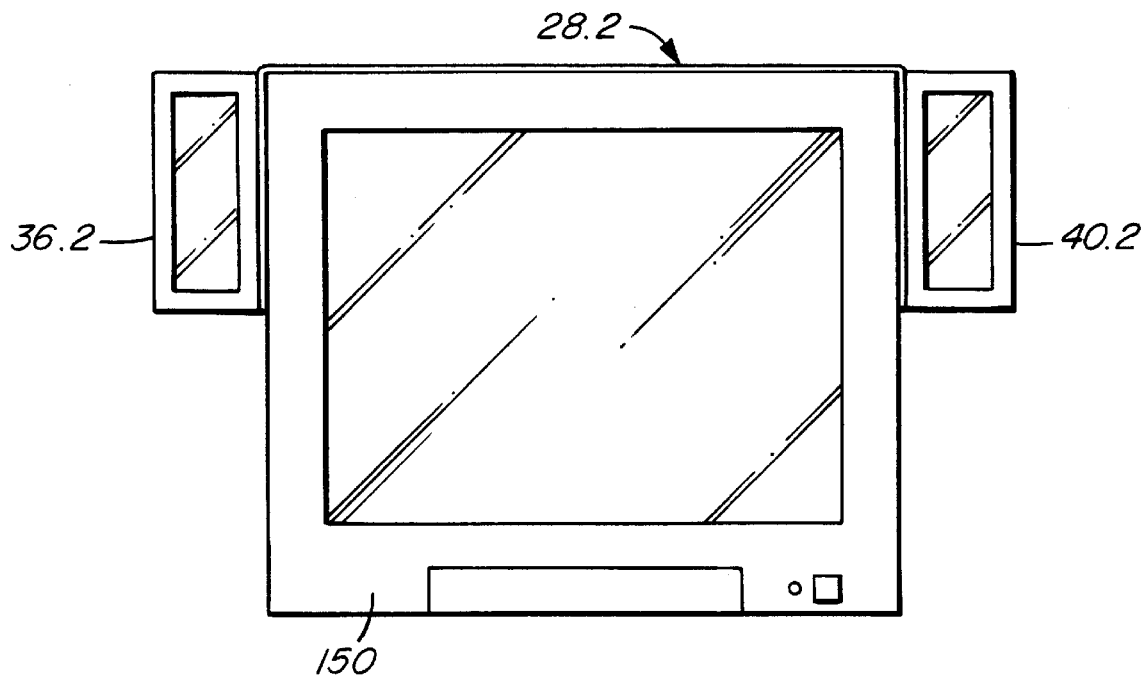
FIG. 8 is a front view of a computer recording disk storage apparatus including a computer monitor, with cases on each side thereof.

FIG. 8 shows a variation of the invention adapted for use with a computer monitor 150. In this particular example, there is a saddle 28. 2 and two cases 36. 2 and 40. 2 which are generally similar to the saddle 28 and cases 36 and 40. However the size of the saddle has been adjusted to fit over the monitor instead of a computer tower. Also there is only room in this example for two cases instead of four.

It will be understood by someone skilled in the art that many of the details described above are by way of example only and are not intended to limit the scope of the invention which is to be interpreted with reference to the following claims.

What is claimed is:

1. A computer disk storage apparatus, comprising:

a computer component;

at least one case having a fabric cover, a rigid box-like insert and an interior cavity shaped and sized to receive a plurality of computer disks; and means for mounting the case on the computer component.

2. A computer disk apparatus, comprising:

computer tower;

at least one case having an interior cavity shaped and sized to receive a plurality of computer disks; and means for mounting the case on the computer tower.

3. A computer disk storage apparatus, comprising;

a computer monitor;

at least one case having an interior cavity shaped and sized to receive a plurality of computer disks; and means for mounting the case on the computer monitor.

* * * * *